(12) United States Patent
Meneghetti et al.

(10) Patent No.: US 11,379,464 B2
(45) Date of Patent: Jul. 5, 2022

(54) ASYMMETRIC QUORUM PROTOCOL BASED DISTRIBUTED TRANSACTION DATABASE CONSISTENCY CONTROL

(71) Applicant: MICRO FOCUS LLC, Santa Clara, CA (US)

(72) Inventors: Niccolo Meneghetti, Santa Clara, CA (US); Yuanzhe Bei, Santa Clara, CA (US)

(73) Assignee: MICRO FOCUS LLC, Santa Clara, CA (US)

(*) Notice: Subject to any disclaimer, the term of this patent is extended or adjusted under 35 U.S.C. 154(b) by 271 days.

(21) Appl. No.: 16/712,500

(22) Filed: Dec. 12, 2019

(65) Prior Publication Data

US 2021/0182270 A1 Jun. 17, 2021

(51) Int. Cl.
*G06F 16/00* (2019.01)
*G06F 16/23* (2019.01)

(52) U.S. Cl.
CPC ...... *G06F 16/2365* (2019.01); *G06F 16/2379* (2019.01)

(58) Field of Classification Search
CPC .. G06F 16/2365; G06F 16/2379; G06F 16/27; G06F 11/08; G06F 11/14; G06F 11/16
See application file for complete search history.

(56) References Cited

U.S. PATENT DOCUMENTS

| | | | | |
|---|---|---|---|---|
| 7,325,046 B1 * | 1/2008 | Novaes | ............. | G06F 9/5061 718/1 |
| 7,472,254 B2 * | 12/2008 | Collins | ............. | G06F 16/1787 711/221 |
| 7,500,020 B1 * | 3/2009 | Kabra | ............. | G06F 16/1787 709/248 |
| 7,653,668 B1 * | 1/2010 | Shelat | ............. | G06F 16/184 707/610 |
| 8,478,790 B2 | 7/2013 | Annapragada | | |
| 8,812,632 B2 * | 8/2014 | Buendgen | ............. | H04L 41/0893 370/354 |
| 2005/0038783 A1 * | 2/2005 | Lei | ............. | G06F 16/2457 707/999.005 |

(Continued)

FOREIGN PATENT DOCUMENTS

| | | |
|---|---|---|
| CN | 109964446 A | 7/2019 |
| WO | WO 2018146207 A1 | 8/2018 |

OTHER PUBLICATIONS

Chocker et al., "Multi-Shot distributed transaction commit", 32nd International Symposium on Distributed Computing (DISC 2018). Article No. 14; pp. 14:1-14:24.

*Primary Examiner* — Noosha Arjomandi (57) ABSTRACT

In some examples, asymmetric quorum protocol based distributed transaction database consistency control may include determining, by a set of primary participants of a cluster, whether a cluster-wide quorum has been reached to commit a transaction associated with a distributed transactional database. Further, based on the determination by the set of primary participants that the cluster-wide quorum has been reached to commit the transaction, instructions to a set of secondary participants of the cluster may be sent to commit the transaction. The set of secondary participants may be configured to comply with a determination by the set of primary participants to commit or to not-commit the transaction.

20 Claims, 9 Drawing Sheets

(56) References Cited

U.S. PATENT DOCUMENTS

| | | | |
|---|---|---|---|
| 2006/0235889 A1* | 10/2006 | Rousseau | G06F 9/466 |
| 2006/0253856 A1* | 11/2006 | Hu | G06F 9/526 |
| | | | 718/104 |
| 2011/0047413 A1* | 2/2011 | McGill | H04L 69/40 |
| | | | 717/172 |
| 2011/0161281 A1* | 6/2011 | Sayyaparaju | G06F 16/2379 |
| | | | 711/E12.001 |
| 2012/0290691 A1* | 11/2012 | Buendgen | G06F 9/5061 |
| | | | 709/220 |
| 2013/0036106 A1* | 2/2013 | Lucas | G06F 16/2315 |
| | | | 707/703 |
| 2013/0173763 A1* | 7/2013 | Buendgen | G06F 9/5061 |
| | | | 709/220 |
| 2015/0227318 A1* | 8/2015 | Banka | G06F 3/0679 |
| | | | 709/202 |
| 2016/0085606 A1* | 3/2016 | Panasko | G06F 11/076 |
| | | | 714/37 |
| 2016/0119427 A1* | 4/2016 | Rao | H04L 29/08549 |
| | | | 709/223 |
| 2017/0318092 A1* | 11/2017 | Maredia | H04L 45/28 |
| 2018/0129692 A1 | 5/2018 | Jagtiani | |
| 2019/0104115 A1 | 4/2019 | Bacher et al. | |
| 2019/0268407 A1 | 8/2019 | Zeng et al. | |
| 2019/0340011 A1* | 11/2019 | Raman | G06F 9/466 |
| 2020/0053163 A1* | 2/2020 | Ngo | H04L 9/088 |
| 2021/0182270 A1* | 6/2021 | Meneghetti | G06F 16/2379 |

\* cited by examiner

DETERMINE, BY A SET OF PRIMARY PARTICIPANTS OF A CLUSTER, WHETHER A CLUSTER-WIDE QUORUM HAS BEEN REACHED TO COMMIT A TRANSACTION ASSOCIATED WITH A DISTRIBUTED TRANSACTIONAL DATABASE
802

SEND, BASED ON A DETERMINATION BY THE SET OF PRIMARY PARTICIPANTS THAT THE CLUSTER-WIDE QUORUM HAS NOT BEEN REACHED TO COMMIT THE TRANSACTION, OR THAT THE CLUSTER-WIDE QUORUM HAS BEEN REACHED TO NOT COMMIT THE TRANSACTION, INSTRUCTIONS TO A SET OF SECONDARY PARTICIPANTS OF THE CLUSTER TO NOT COMMIT THE TRANSACTION
804

ASYMMETRIC QUORUM PROTOCOL BASED DISTRIBUTED TRANSACTION DATABASE CONSISTENCY CONTROL

BACKGROUND

A distributed database may be designated as a distributed transactional database if it enforces properties such as atomicity, consistency, isolation, and durability. Atomicity may represent a property where each transaction associated with the database is either fully committed or is fully aborted. Consistency may represent a property where a distributed state of the database remains consistent before and after every transaction. Isolation may represent a property where each transaction runs in isolation from other transactions. Further, durability may represent a property where every committed transaction is persisted, for example, to disk.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Asymmetric quorum protocol based distributed transaction database consistency control apparatuses, methods for asymmetric quorum protocol based distributed transaction database consistency control, and non-transitory computer readable media having stored thereon machine readable instructions to provide asymmetric quorum protocol based distributed transaction database consistency control are disclosed herein. The apparatuses, methods, and non-transitory computer readable media disclosed herein provide for implementation of an asymmetric quorum protocol to allow a distributed transactional database to enforce transactional consistency in the presence of network errors. In this regard, the asymmetric quorum protocol may be considered asymmetric in the sense that not all of the participants (e.g., participating processes) play the same role. For example, some participants that may be designated as primary participants, may have the responsibility of deciding whether a cluster-wide consensus has been reached. Other participants that may be designated as secondary participants may be configured to comply with all decisions made by the primary participants. In this regard, elasticity of the distributed transactional database may be improved. For example, the distributed transactional database may include the ability to increase or decrease a number of the participants over time, with limited impact on fault tolerance, for improvement in the elasticity thereof.

With respect to distributed transactional databases, a distributed system may include a collection of computer processes that run in isolation, and that may coordinate through network communications. A distributed database may include a distributed system whose goal may include storing relational data that may be accessed and modified by each participant in a transactional manner. In this regard, as disclosed herein, a distributed database may be considered transactional if it enforces properties such as atomicity, consistency, isolation, and durability. In order to enforce consistency, a distributed database may need to ensure that all participating processes make the same decision about committing a certain transaction or not committing the transaction, even in the presence of network failures such as network partitioning.

With respect to enforcement of transaction atomicity and consistency at commit time in a distributed database, a quorum protocol may be executed, where each participant may commit a transaction if the participant receives explicit confirmation that more than one half of all of the participants are also committing the transaction. If this confirmation is not received, either because of network partitioning or other failures, then the participant may terminate itself, without committing, and without rolling back the transaction. The quorum protocol may ensure that a unique cluster-wide decision is taken about committing each transaction, independent of network failures. With respect to this quorum protocol, it is technically challenging to add or remove new participants with respect to a system such as a distributed transactional database. For example, at any given moment in time, at least one half of the participants may not be reachable through network communications, for example, because they are about to leave the cluster, or because they have just joined the cluster. In this regard, the cluster may shut itself down, with the intent of preserving consistency. Thus, it is technically challenging to add or remove new participants to a system such as a distributed transactional database, without impacting fault tolerance capabilities of the system.

In order to address at least the aforementioned technical challenges, the apparatuses, methods, and non-transitory computer readable media disclosed herein may implement the asymmetric quorum protocol in which participants (e.g., participating processes) may operate either as primary or as secondary participants. In this regard, each participant may commit a transaction if it receives explicit confirmation that more than one half of the primary participants in a cluster are doing the same. If such a confirmation is not received, either because of network partitioning or other failures, then the participant may terminate itself, without committing or without rolling back the transaction. A number of the primary and/or secondary participants may be specified as needed for a particular task.

According to examples disclosed herein, the apparatuses, methods, and non-transitory computer readable media disclosed herein may provide for variation of the number of secondary participants in a cluster by creating or terminating the corresponding processes, without the need of additional coordination with a quorum protocol. In this regard, cluster elasticity may be improved, for example, by allowing for specification of a cluster size as needed.

According to examples disclosed herein, for the apparatuses, methods, and non-transitory computer readable media disclosed herein, since the secondary participants do not determine whether to commit or to not commit a transaction, the secondary participants may not need to endure durability. For example, the secondary participants may not need to commit a transaction to disk. This aspect may reduce the burden on the secondary participants in a relatively busy cluster, and may provide for higher query throughput for the secondary participants.

According to examples disclosed herein, the apparatuses, methods, and non-transitory computer readable media disclosed herein may provide for the implementation of "on-demand" participants. For example, a cluster may include 256 participants, 64 of which (e.g., the primary participants) are dedicated to extract, transform, and loading, 64 of which are dedicated to query processing, and the other 128 of which (e.g., the secondary participants) may be brought up or brought down on demand. In this regard, even if one half of the 256 participants are shut down to preserve data consistency (e.g., correctness) against network partitioning, an associated system may continue to operate correctly as long as at least 33 of the primary participants (e.g., a strict majority) continue to operate.

In examples described herein, module(s), as described herein, may be any combination of hardware and programming to implement the functionalities of the respective module(s). In some examples described herein, the combinations of hardware and programming may be implemented in a number of different ways. For example, the programming for the modules may be processor executable instructions stored on a non-transitory machine-readable storage medium and the hardware for the modules may include at least one processing resource (e.g., at least one processor, CPU, circuitry, etc.) to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry, FIG. 1 illustrates a layout of an example asymmetric quorum protocol based distributed transaction database consistency control apparatus (hereinafter also referred to as "apparatus 100").

Figure 1:
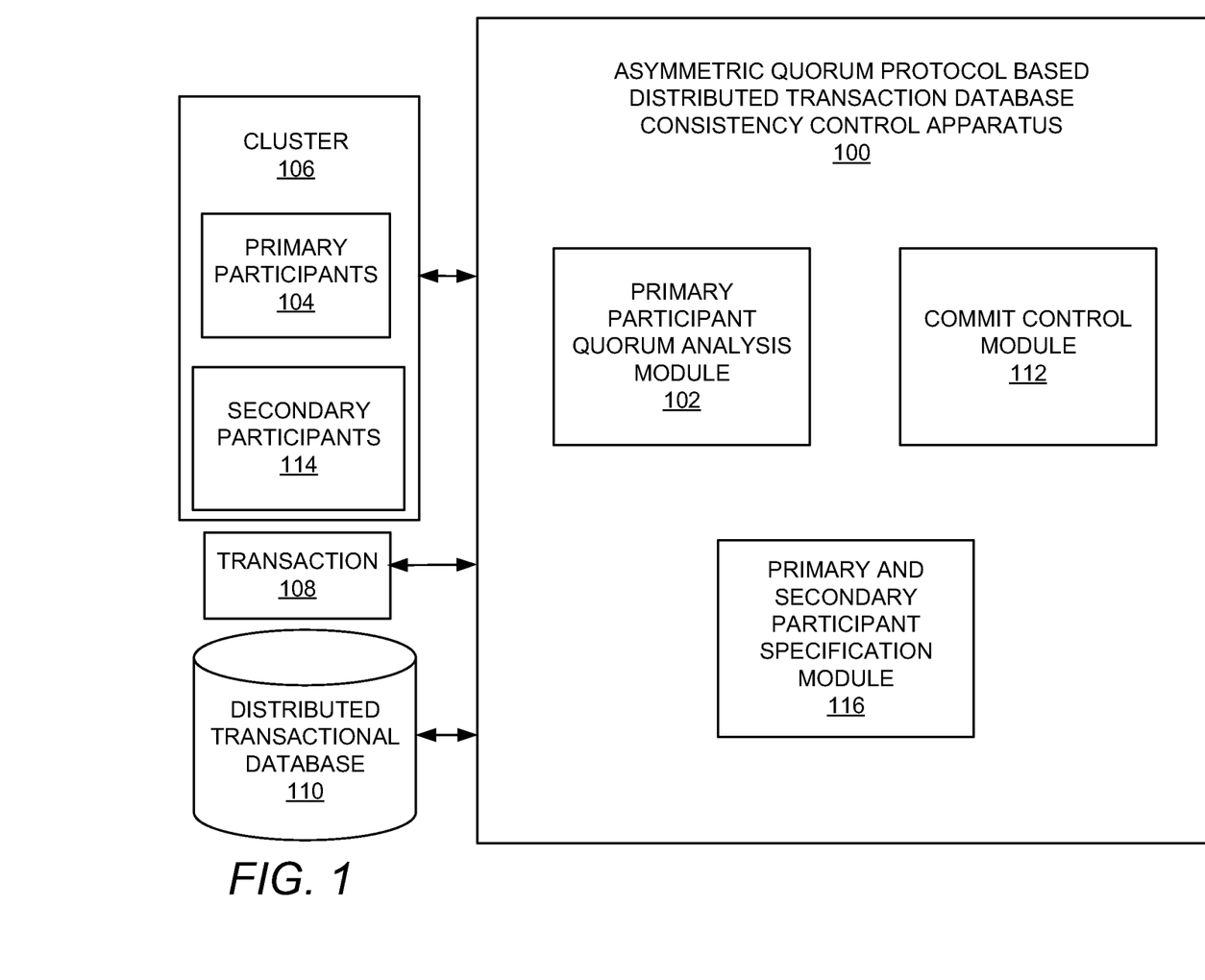
FIG. 1 illustrates a layout of an asymmetric quorum protocol based distributed transaction database consistency control apparatus in accordance with an example of the present disclosure.

Referring to FIG. 1, the apparatus 100 may include a primary participant quorum analysis module 102 to determine, by a set of primary participants 104 (e.g., primary participating processes) of a cluster 106, whether a cluster-wide quorum has been reached to commit a transaction 108 associated with a distributed transactional database 110. Instead of the participants, the apparatus 100 may also be implemented with nodes. For example, with respect to nodes and participants, a node may represent a hardware device attached to the network, that hosts a portion of the distributed transactional database 110, and a participant may represent a process in charge of committing and aborting transactions. There may be at least one participant per node. A transaction 108 as disclosed herein may be a set of operations that modify an internal state of the distributed transactional database 110.

According to examples disclosed herein, the primary participant quorum analysis module 102 may determine, by the set of primary participants 104 of the cluster 106, whether the cluster-wide quorum has been reached by determining whether greater than one-half of the primary participants 104 have determined to commit or to not-commit the transaction 108 associated with the distributed transactional database 110. In this regard, a cluster-wide quorum may include any subset of the primary participants 104 that form a majority.

A commit control module 112 may send, based on the determination by the set of primary participants 104 of the cluster 106 that the cluster-wide quorum has been reached to commit the transaction 108, instructions to a set of secondary participants 114 of the cluster 106 to commit the transaction 108. In this regard, the set of secondary participants 114 may be configured to comply with a determination by the set of primary participants 104 of the cluster 106 to commit or to not-commit the transaction 108. The set of secondary participants 114 may refer to any participants that are not accounted into a quorum. In this regard, in the presence of secondary participants, a quorum may be reached whenever a majority of the primary participants is operational (e.g., "up" as disclosed herein), and agrees on performing a certain operation. For example, the cluster 106 may include additional primary participants in addition to the primary participants 104, but the additional primary participants may not be designated or otherwise have agreed to perform quorum analysis for committing or not-committing the transaction 108. Similarly, a quorum may be lost whenever at least one half of the primary participants are not operational (e.g., "down" as disclosed herein).

According to examples disclosed herein, the commit control module 112 may send, based on a determination by the set of primary participants 104 of the cluster 106 that the cluster-wide quorum has not been reached to commit the transaction 108, instructions to the set of secondary participants 114 to not commit the transaction 108.

According to examples disclosed herein, the commit control module 112 may send, based on a determination by the primary participants 104 of the cluster 106 that the cluster-wide quorum has been reached to not commit the transaction 108, instructions to the set of secondary participants 114 to not commit the transaction 108.

A primary and secondary participant specification module 116 may specify a number of the primary participants 104 as being less than a number of the secondary participants 114. Alternatively, the primary and secondary participant specification module 116 may specify a number of the primary participants as being equal to a number of the secondary participants 114. Alternatively, the primary and secondary participant specification module 116 may specify a number of the primary participants 104 as being greater than a number of the secondary participants 114.

According to examples disclosed herein, the transaction 108 may represent an initial transaction. In this regard, the primary and secondary participant specification module 116 may specify a number of the secondary participants 114 for a further transaction as being different from a number of the secondary participants 114 for the initial transaction.

Figure 4:
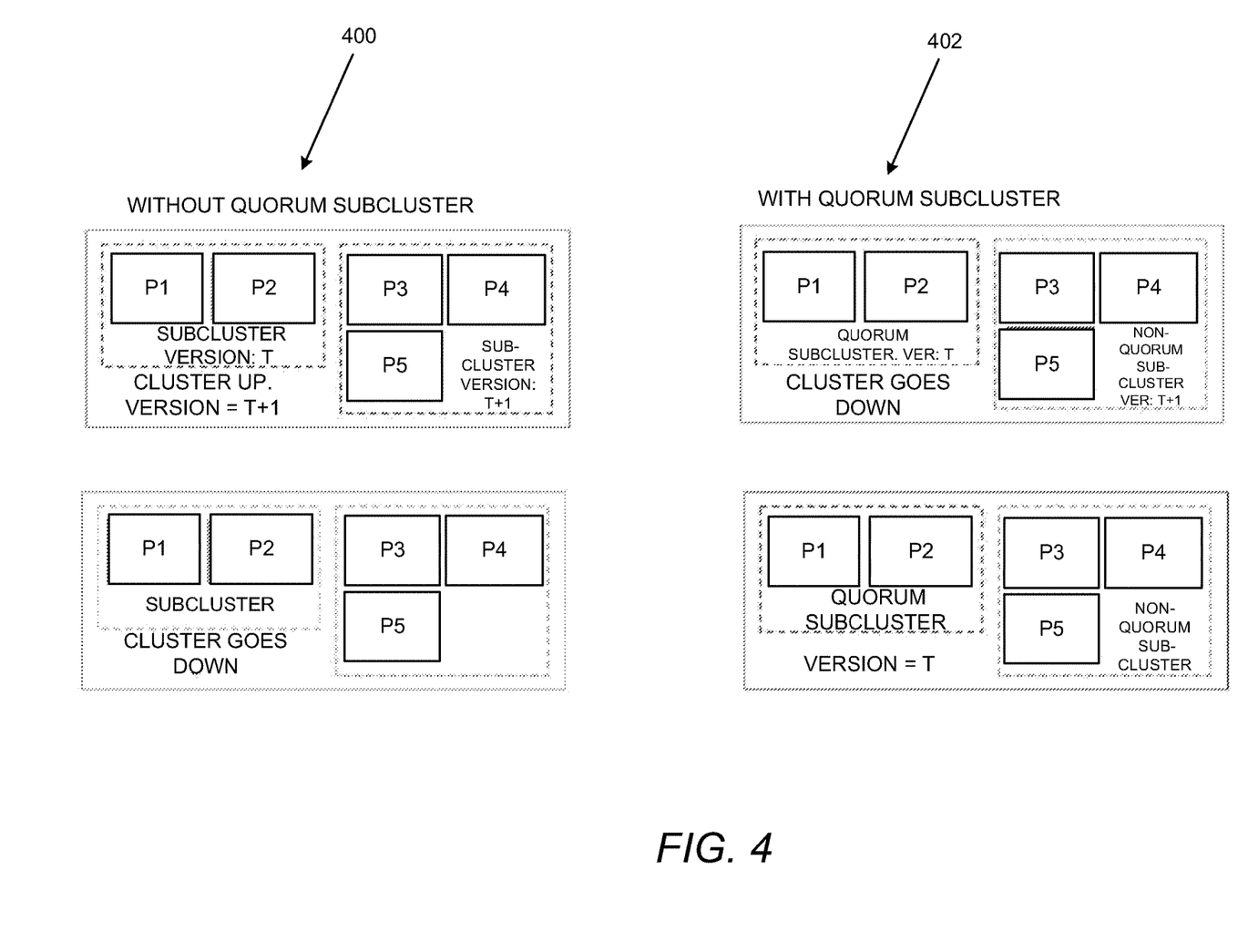
FIG. 4 illustrates an example of quorum and non-quorum subclusters, and catalog truncation, to illustrate operation of the asymmetric quorum protocol based distributed transaction database consistency control apparatus of FIG. 1 in accordance with an example of the present disclosure.

According to examples disclosed herein with reference to FIGS. 1 and 4, the commit control module 112 may determine that the primary participants 104 are operational after a malfunction of the primary participants 104 (e.g., the primary participants 104 are "down"). The commit control module 112 may determine a version (e.g., version T) associated with the primary participants 104 prior to the malfunction of the primary participants 104. Further, the commit control module 112 may set a version of the cluster 106 as the version associated with the primary participants 104 prior to the malfunction of the primary participants 104.

Figure 6:
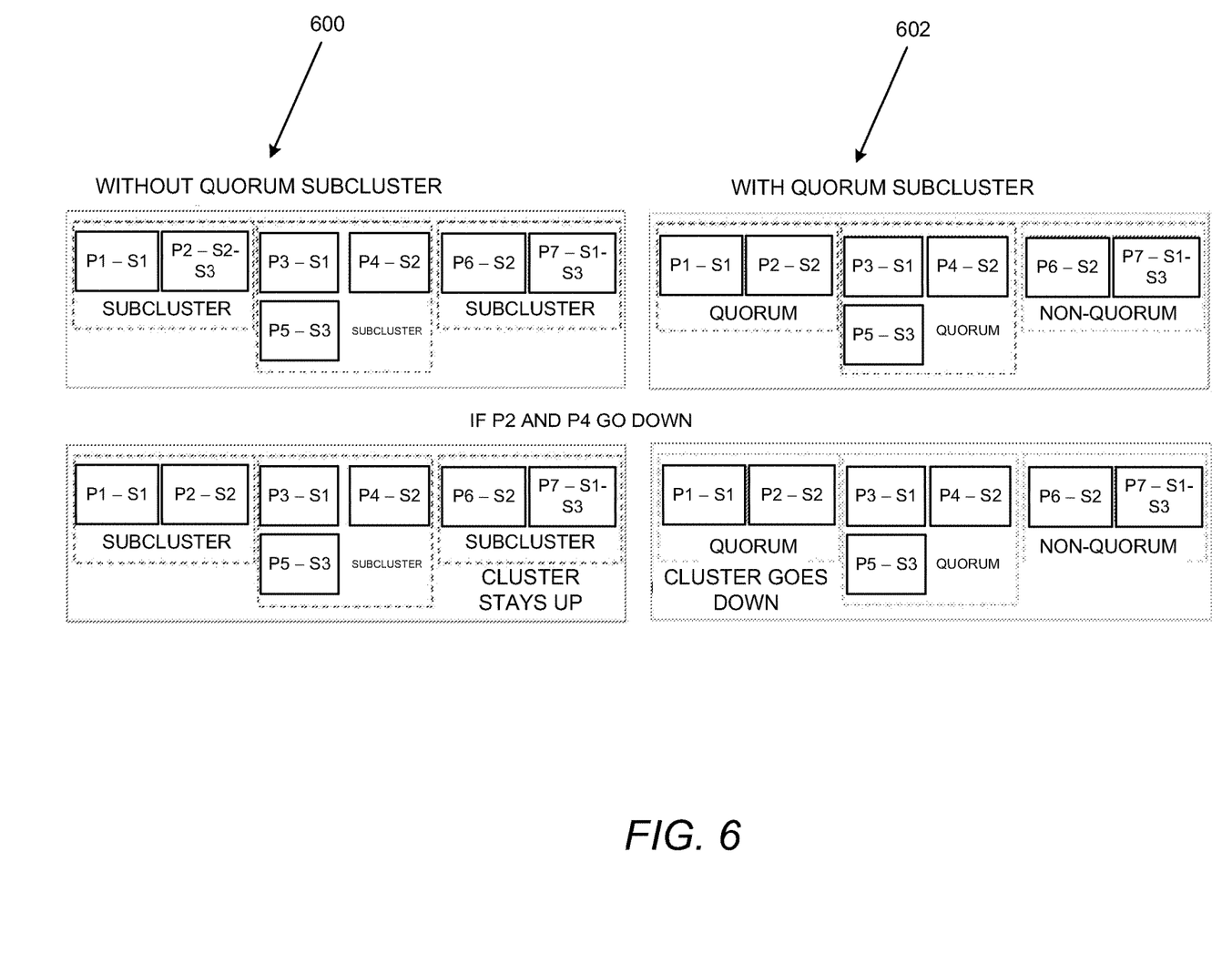
FIG. 6 illustrates an example of data segment coverage with quorum and non-quorum subclusters to illustrate operation of the asymmetric quorum protocol based distributed transaction database consistency control apparatus of FIG. 1 in accordance with an example of the present disclosure.

According to examples disclosed herein with reference to FIGS. 1 and 6, if the primary participants 104 include data segment coverage, based on a determination that a primary participant of the primary participants 104 including data segment coverage has malfunctioned, the commit control module 112 may send instructions to all participants of the cluster 106 to not commit the transaction 108.

Operation of the apparatus 100 is described in further detail with reference to FIGS. 1-6.

Referring to FIG. 1, according to examples disclosed herein, the primary participants 104 may be assigned authority with respect to operations that include committing a transaction. The primary participant quorum analysis module 102 may be assigned authority with respect to cluster formation, and/or enforcement of k-safety. With respect to cluster formation, the primary participant quorum analysis module 102 may designate participants as primary participants or secondary participants.

With respect to k-safety, the primary participants 104 may need to complete data segment coverage and be k-safe. With respect to data segment coverage, in a shared-storage mode, data may be segmented into a certain number of data segments (e.g., a constant when creating the database). Each node in the database may subscribe to certain data segments to answer queries. For example, if data is segmented into four data segments, then the operational (e.g., "up") primary nodes may need to have at least one up-to-date subscription to each data segment, and otherwise a query may not return the correct result. Further, k-safe may refer to the aspect of database functionality (e.g., if k nodes in a cluster are lost, regardless of which nodes, the database is guaranteed to be remain functional). For example, for k=1, despite losing any one node (e.g., a node is not operational) the database remains functional, whereas if two nodes are lost, the database may not remain functional.

According to examples disclosed herein, the secondary participants 114 may be designated to belong to a subcluster as disclosed herein. The secondary participants may be specified so that they do not share a subcluster with a primary participant.

For the apparatus 100, data consistency may be implemented by a first property that specifies that any two arbitrary sets of participants that may form a quorum are to share at least one participant. A second property with respect to data consistency may specify that a set of the primary participants is k-safe, and thus has complete data segment coverage.

With respect to the primary participants 104 and the secondary participants 114, for fault-tolerance, the distributed transactional database 110 may be considered to malfunction if the primary participants 104 lose data segment coverage, and at least one half of the primary participants 104 are down (e.g., quorum is lost). The distributed transactional database 110 may generate an error if a secondary subcluster loses data segment coverage and a query is run on it. Further, the distributed transactional database 110 may operate correctly (e.g., stay "up" as disclosed herein) as long as the primary participants 104 reach quorum and maintain data segment coverage.

Figure 2:
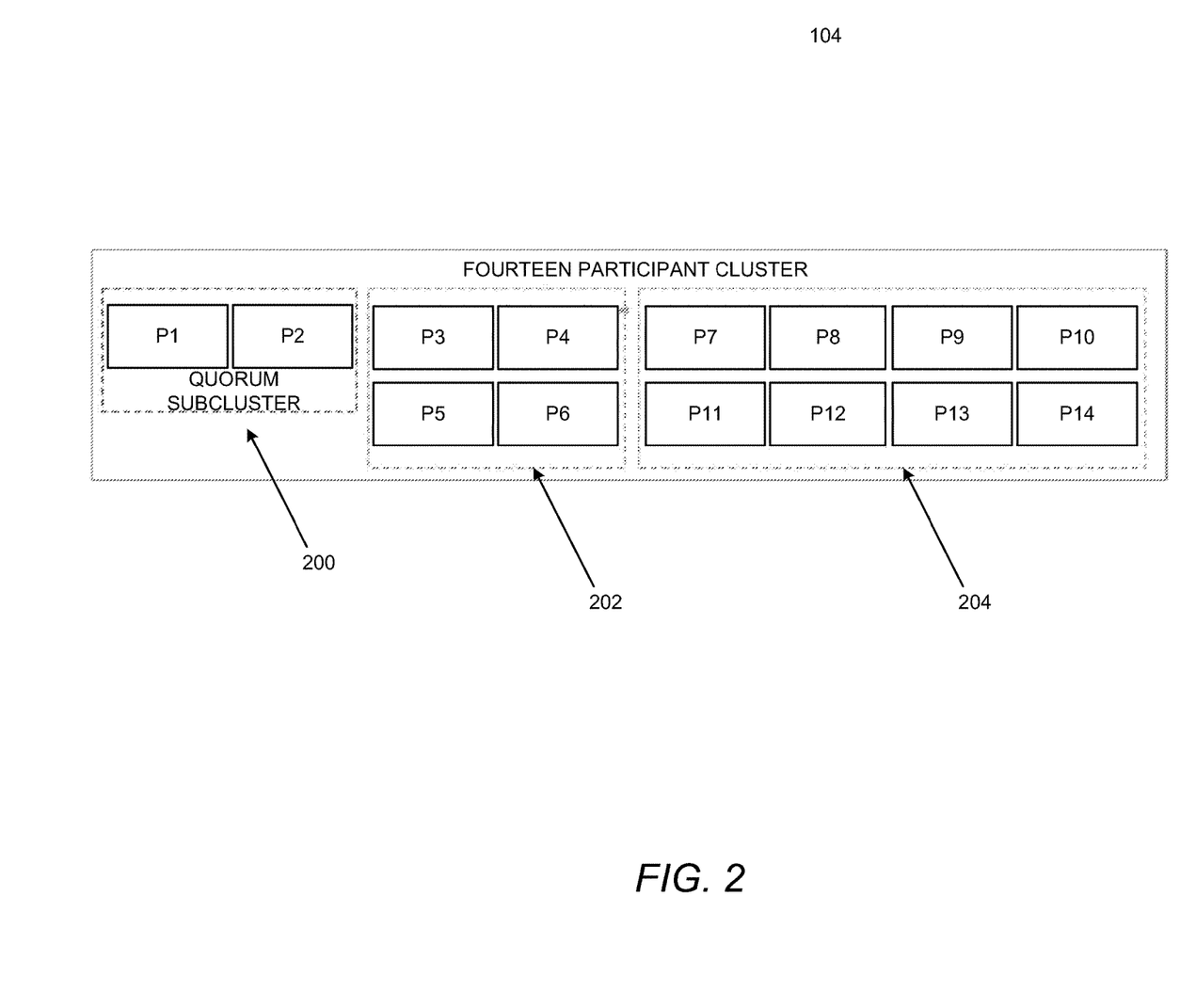
FIG. 2 illustrates an example of quorum and non-quorum subclusters to illustrate operation of the asymmetric quorum protocol based distributed transaction database consistency control apparatus of FIG. 1 in accordance with an example of the present disclosure.

The primary participants 104 and the secondary participants 114 may be respectively clustered into a quorum subcluster and a non-quorum subcluster as disclosed herein with respect to FIG. 2. In this regard, the distributed transactional database 110 may be designated as being operational as long as the quorum subcluster is operational (e.g., the quorum subcluster is designated "up"). The secondary participants of the non-quorum subcluster may not have any metadata present in the primary participants. For example, the secondary participants 114 may not have any catalog object (e.g., metadata of the database, such as table, user, etc.) or transaction that is present in the secondary participants 114 but not in the primary participants 104. The implementation of the quorum subcluster and the non-quorum subcluster provides for starting or stopping of subclusters, such as non-quorum subclusters (or individual participants within a non-quorum subcluster), without impacting operational availability of the distributed transactional database 110.

With respect to the implementation of the apparatus 100 utilizing the quorum and non-quorum subclusters, the distributed transactional database 110 may be considered to malfunction (e.g., go "down" as disclosed herein) if the distributed transactional database 110 does not have data segment coverage across a quorum subcluster and/or the distributed transactional database 110 has data segment coverage, but loses a majority (e.g., more than one half) of the primary participants 104 across a quorum subcluster.

With respect to the implementation of the apparatus 100 utilizing the quorum and non-quorum subclusters, the distributed transactional database 110 may generate an error if the distributed transactional database 110 does not have data segment coverage for a non-quorum subcluster, and a query is executed in the non-quorum subcluster and/or the distributed transactional database 110 has data segment coverage for a non-quorum subcluster, but that subcluster has lost a majority of the participants.

With respect to the implementation of the apparatus 100 utilizing the quorum and non-quorum subclusters, the distributed transactional database 110 may be considered as operating correctly (e.g., as "up" as disclosed herein) when at least one quorum subcluster is operating correctly (e.g., is "up") and has enough data segment coverage, and a strict majority of the primary participants across the quorum subclusters is operating correctly.

With respect to the implementation of the apparatus 100 utilizing the quorum and non-quorum subclusters, FIG. 2 illustrates an example of quorum and non-quorum subclusters to illustrate operation of the apparatus 100 in accordance with an example of the present disclosure.

Referring to FIG. 2, for an example of a cluster including fourteen participants, participants P1 and P2 that may belong to a quorum subcluster 200 that may represent an extract, transform, and load subcluster. Non-quorum subcluster 202 may include participants P3, P4, P5, and P6. Further, non-quorum subcluster 204 may include participants P7, P8, P9, P10, P11, P12, P13, and P14. With respect to the example of FIG. 2, the distributed transactional database 110 may remain operational (e.g., "up") as long as participants P1 and P2 are operational (e.g., are "up") and include sufficient data segment coverage.

Figure 3:
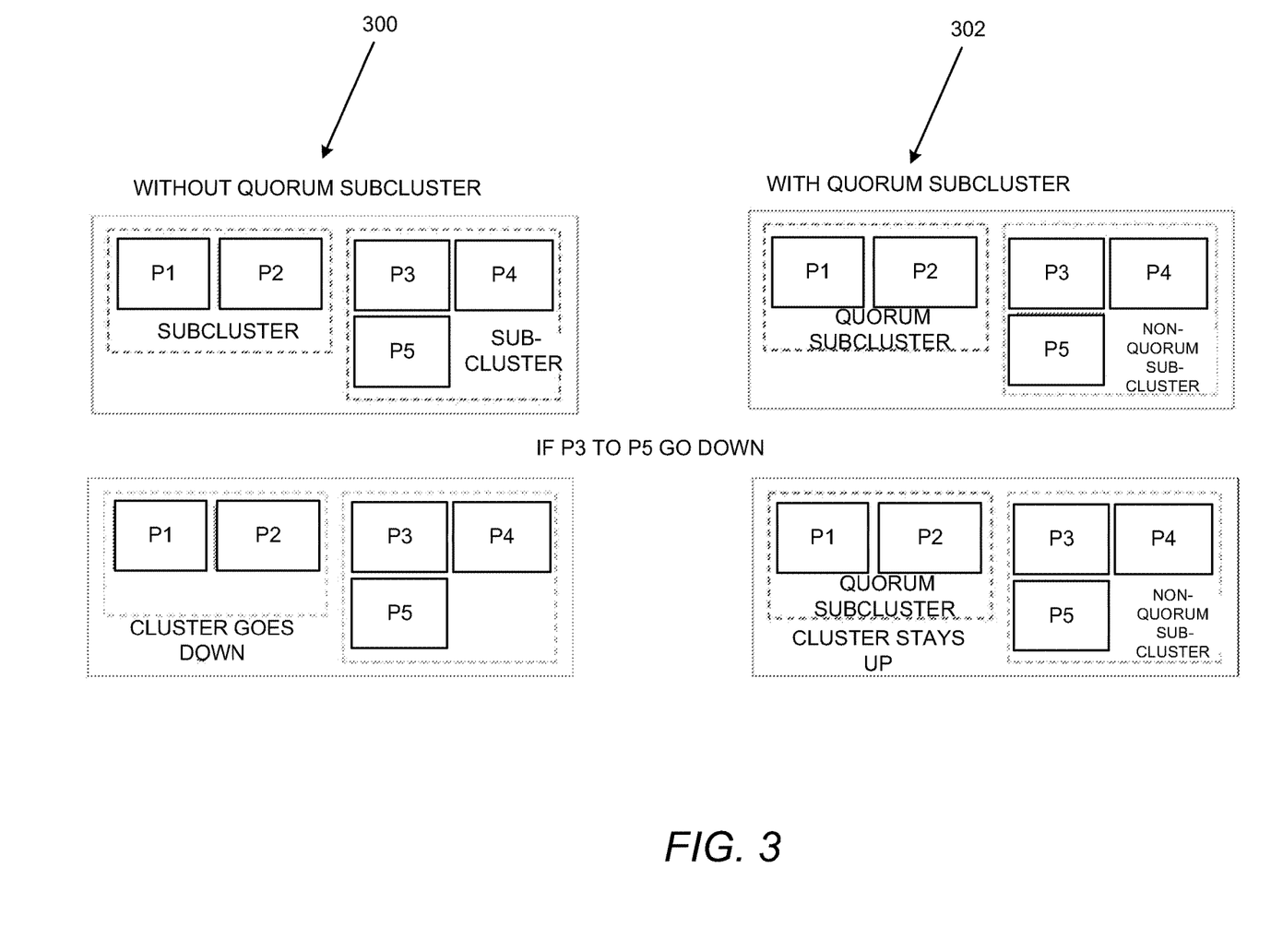
FIG. 3 illustrates another example of quorum and non-quorum subclusters to illustrate operation of the asymmetric quorum protocol based distributed transaction database consistency control apparatus of FIG. 1 in accordance with an example of the present disclosure.

FIG. 3 illustrates another example of quorum and non-quorum subclusters to illustrate operation of the apparatus 100 in accordance with an example of the present disclosure.

Referring to FIG. 3, at 300, for a cluster including five participants (e.g., P1 to P5), if three participants (e.g., P3 to P5) go down, the cluster will shut down because there are less than one half of the participants that remain operational (e.g., "up"). At 302, based on an implementation that includes a quorum subcluster (e.g., P1 and P2) and a non-quorum subcluster (P3, P4, and P5), even if all of the participants of the non-quorum subcluster go down, the cluster at 302 remains operational.

FIG. 4 illustrates another example of quorum and non-quorum subclusters, and catalog truncation, to illustrate operation of the apparatus 100 in accordance with an example of the present disclosure.

Referring to FIG. 4, with respect to catalog truncation, catalog truncation may be decided by quorum participants. With respect to catalog truncation, when database schema evolves, a new catalog object may be entered (e.g., create table), and an existing catalog object may be modified or dropped. Each change may increment the catalog version. Catalog truncation may be needed when the newest version does not cover quorum and data segment coverage, in which case the consistency of this particular version cannot be guaranteed, hence catalog truncation may be needed to rewind the catalog to an earlier version where the consistency can be guaranteed. In this regard, for the example of FIG. 4, in a five participants cluster, if two participants go down, the clustering may commit more transactions while these two participants are down. For example, as shown at 400, when the two participants (e.g., P1 and P2) come back up, catalog may be received from the other three participants (e.g., P3, P4, and P5), and recovery may be implemented to bring catalog for the two participants (e.g., P1 and P2) to the latest version of the cluster. At 402, with the implementation of a quorum subcluster and a non-quorum subcluster, if the two participants (e.g., P1 and P2) are quorum participants, the cluster will go down with them. Once the cluster is operational (e.g., "up"), catalog truncation may occur, and a global catalog version may revert back to the safe and latest version that the quorum subcluster has.

Figure 5:
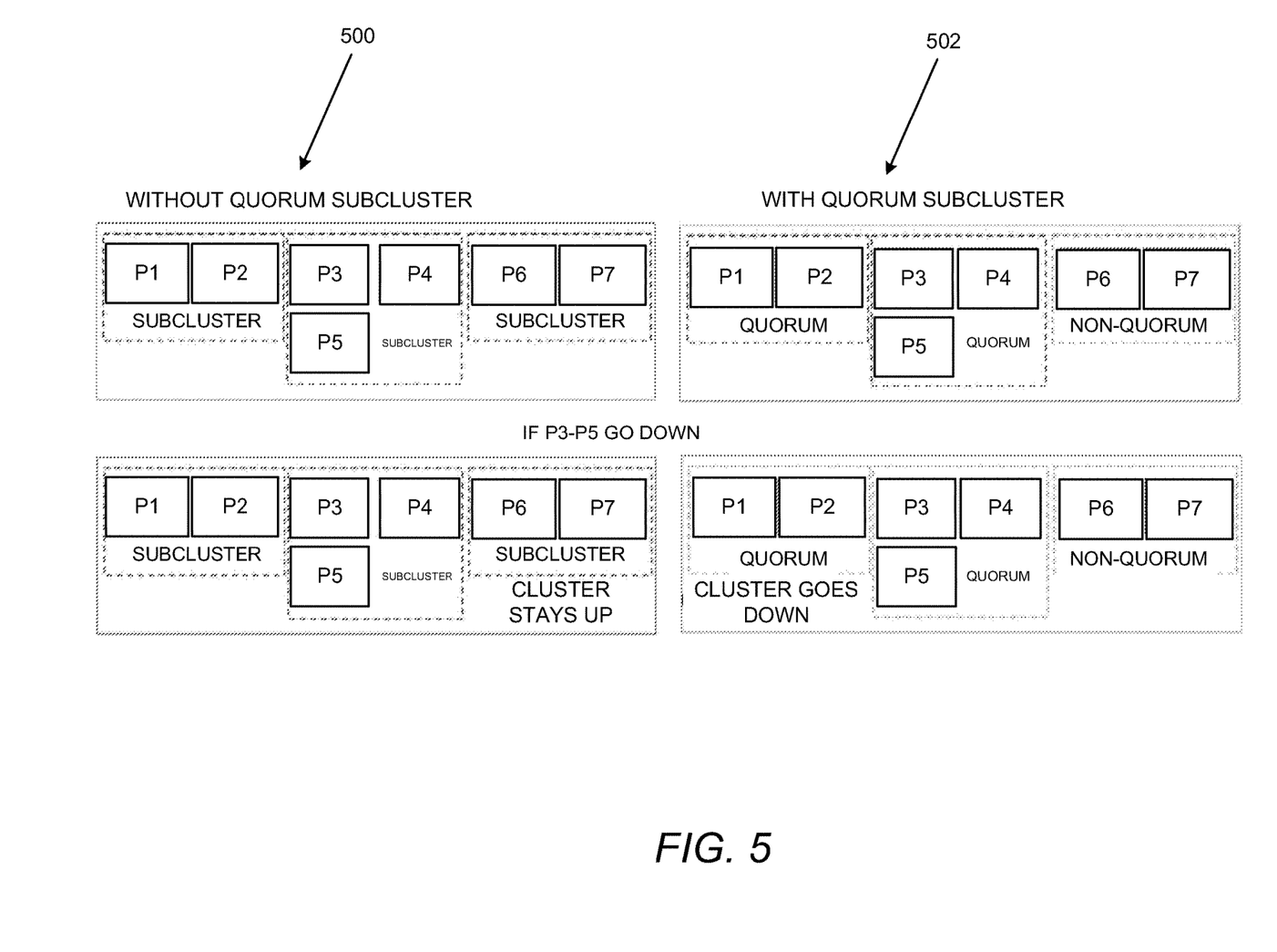
FIG. 5 illustrates an example of utilizing multiple quorum and non-quorum subclusters to illustrate operation of the asymmetric quorum protocol based distributed transaction database consistency control apparatus of FIG. 1 in accordance with an example of the present disclosure.

FIG. 5 illustrates an example of utilizing multiple quorum and non-quorum subclusters to illustrate operation of the apparatus 100 in accordance with an example of the present disclosure.

Referring to FIG. 5, for an example of a seven participant cluster that includes three subclusters, a first subcluster (e.g., P1 and P2) may be a quorum subcluster, a second subcluster (e.g., P3, P4, and P5) may be a quorum subcluster, and a third subcluster (e.g., P6 and P7) may be a non-quorum subcluster. At 500, without the implementation of quorum and non-quorum subclusters, if the second subcluster goes down, the cluster still has five participants that are operational (e.g., "up"), and if there is enough data segment coverage, the cluster will remain operational (e.g., "up"). At 502, with the implementation of quorum and non-quorum subclusters, if the second subcluster goes down, the cluster will also shut down, as its quorum subclusters have lost more than one half of their participants. Thus, a benefit of utilizing quorum and non-quorum subclusters is that non-quorum subclusters may be shut down as needed, for example, to save operational cost, while the main database is still up and running.

FIG. 6 illustrates an example of data segment coverage with quorum and non-quorum clusters to illustrate operation of the apparatus 100 in accordance with an example of the present disclosure.

Referring to FIG. 6, a cluster may go down if quorum subclusters lose data segment coverage. For example, for a seven participant cluster with k=0, a first subcluster (e.g., P1 and P2) may be a quorum subcluster, a second subcluster (e.g., P3, P4, and P5) may be a quorum subcluster, and a third subcluster (e.g., P6 and P7) may be a non-quorum subcluster. At 600, without the implementation of quorum and non-quorum subclusters, if P2 and P4 go down, the cluster will stay up because it still has five participants and sufficient data segment coverage. At 602, with the implementation of quorum and non-quorum subclusters, if P2 and P4 go down, the cluster goes down, because its quorum subclusters have lost data segment coverage for S2.

Figure 7:
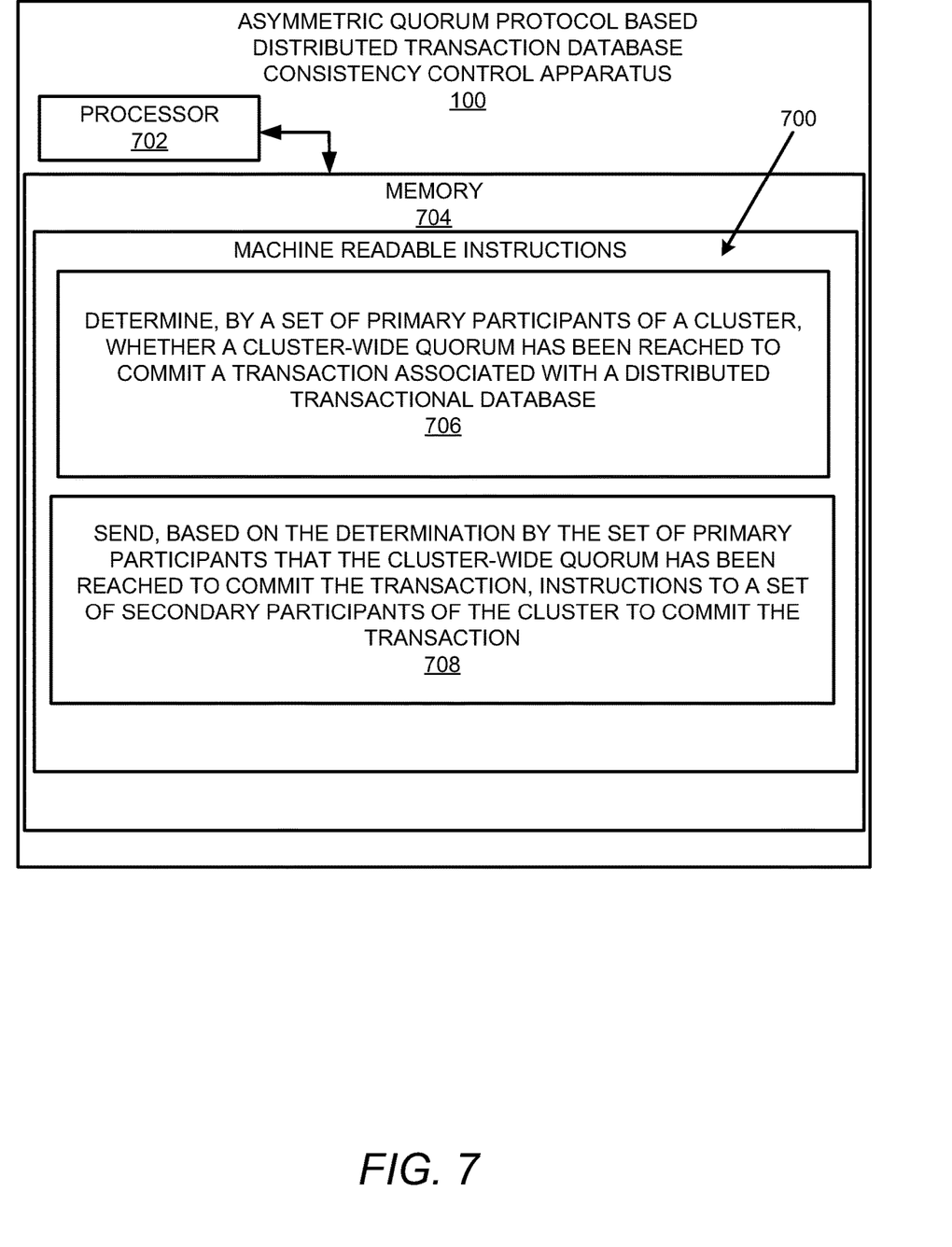
FIG. 7 illustrates an example block diagram for asymmetric quorum protocol based distributed transaction database consistency control in accordance with an example of the present disclosure.
Figure 8:
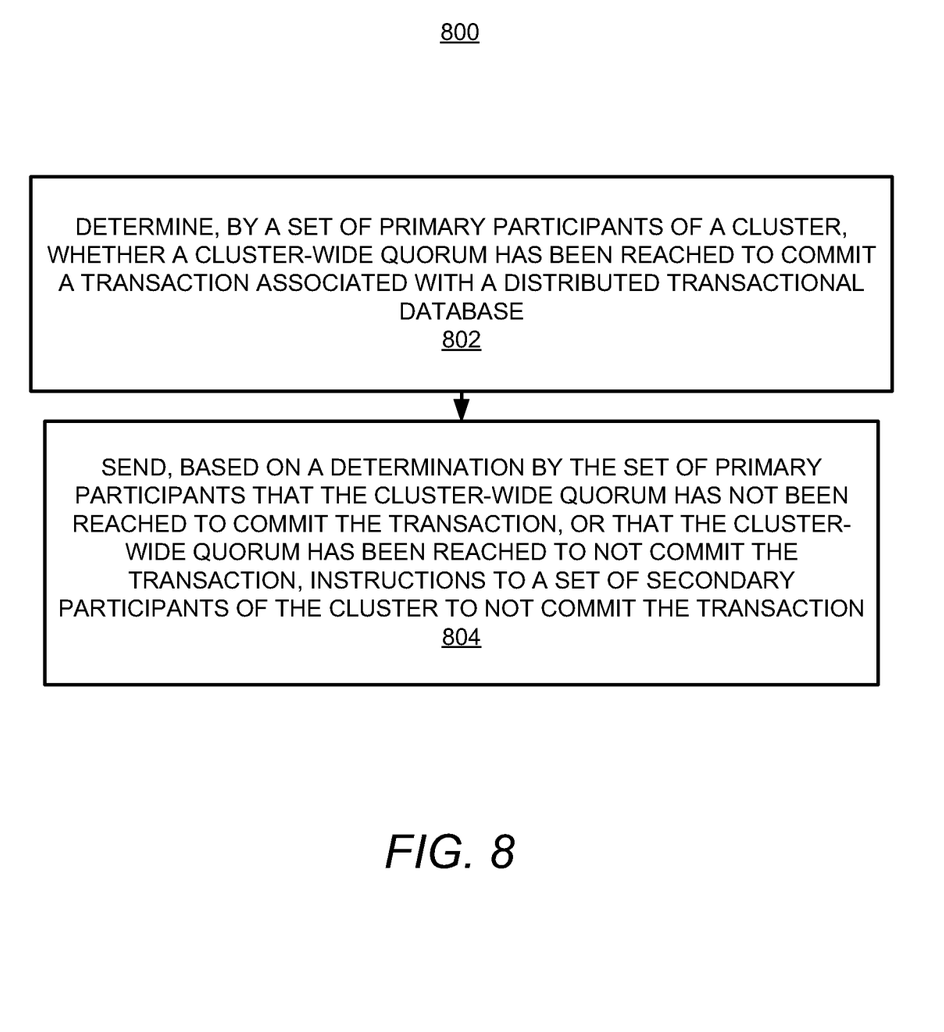
FIG. 8 illustrates a flowchart of an example method for asymmetric quorum protocol based distributed transaction database consistency control in accordance with an example of the present disclosure.
Figure 9:
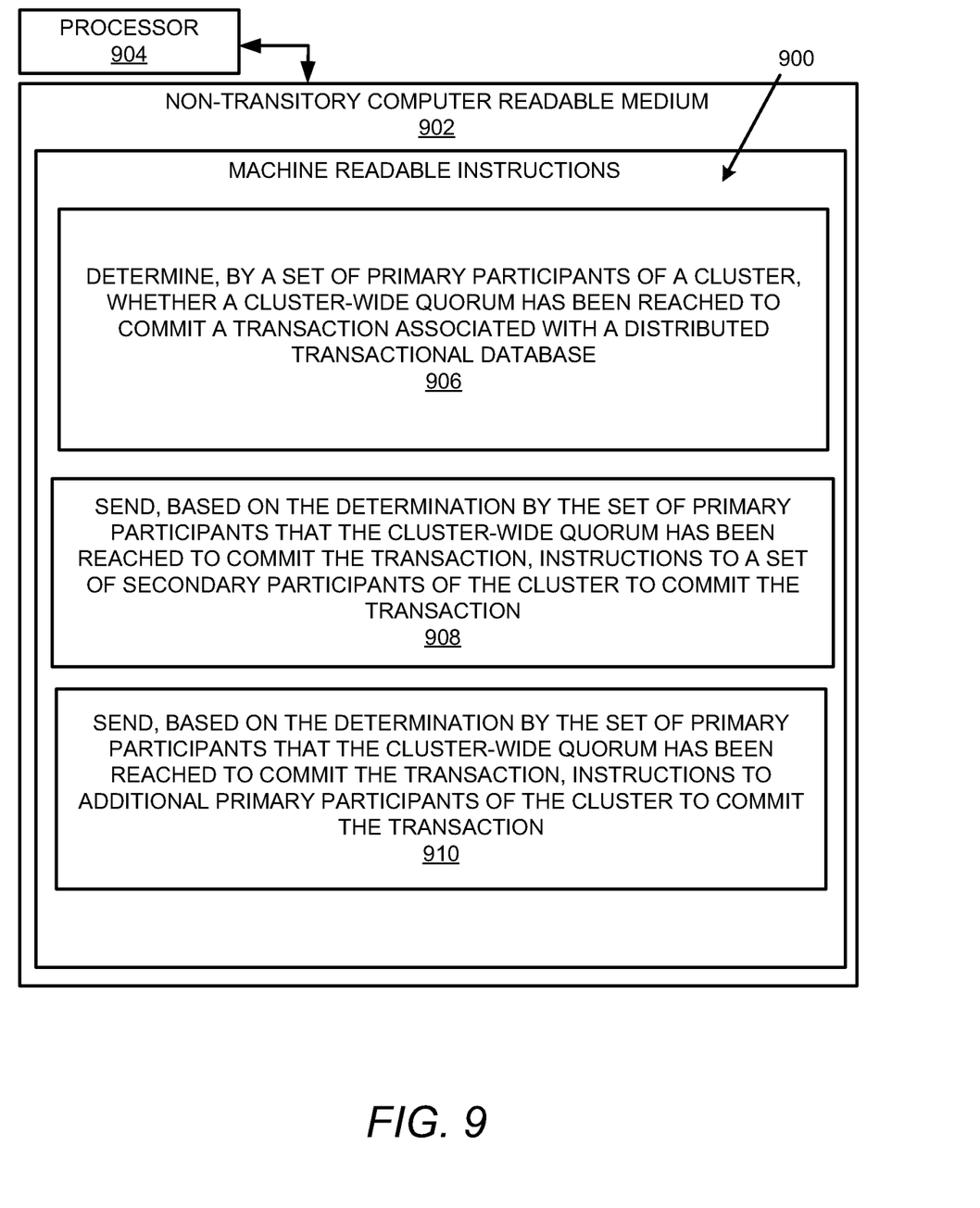
FIG. 9 illustrates a further example block diagram for asymmetric quorum protocol based distributed transaction database consistency control in accordance with another example of the present disclosure.

FIGS. 7-9 respectively illustrate an example block diagram 700, a flowchart of an example method 800, and a further example block diagram 900 for asymmetric quorum protocol based distributed transaction database consistency control, according to examples. The block diagram 700, the method 800, and the block diagram 900 may be implemented on the apparatus 100 described above with reference to FIG. 1 by way of example and not of limitation. The block diagram 700, the method 800, and the block diagram 900 may be practiced in other apparatus. In addition to showing the block diagram 700, FIG. 7 shows hardware of the apparatus 100 that may execute the instructions of the block diagram 700. The hardware may include a processor 702, and a memory 704 storing machine readable instructions that when executed by the processor cause the processor to perform the instructions of the block diagram 700. The memory 704 may represent a non-transitory computer readable medium. FIG. 8 may represent an example method for asymmetric quorum protocol based distributed transaction database consistency control, and the steps of the method. FIG. 9 may represent a non-transitory computer readable medium 902 having stored thereon machine readable instructions to provide asymmetric quorum protocol based distributed transaction database consistency control according to an example. The machine readable instructions, when executed, cause a processor 904 to perform the instructions of the block diagram 900 also shown in FIG. 9.

The processor 702 of FIG. 7 and/or the processor 904 of FIG. 9 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 902 of FIG. 9), such as hardware storage devices (e.g., RAM (random access memory), ROM (read only memory), EPROM (erasable, programmable ROM), EEPROM (electrically erasable, programmable ROM), hard drives, and flash memory). The memory 704 may include a RAM, where the machine readable instructions and data for a processor may reside during runtime.

Referring to FIGS. 1-7, and particularly to the block diagram 700 shown in FIG. 7, the memory 704 may include instructions 706 to determine, by a set of primary participants 104 of a cluster 106, whether a cluster-wide quorum has been reached to commit a transaction 108 associated with a distributed transactional database 110.

The processor 702 may fetch, decode, and execute the instructions 708 to send, based on the determination by the set of primary participants 104 that the cluster-wide quorum has been reached to commit the transaction 108, instructions to a set of secondary participants 114 of the cluster 106 to commit the transaction 108. In this regard, the set of secondary participants 114 may be configured to comply with a determination by the set of primary participants 104 to commit or to not-commit the transaction 108.

Referring to FIGS. 1-6 and 8, and particularly FIG. 8, for the method 800, at block 802, the method may include determining, by a set of primary participants 104 of a cluster 106, whether a cluster-wide quorum has been reached to commit a transaction 108 associated with a distributed transactional database 110.

At block 804, the method may include sending, based on a determination by the set of primary participants 104 that the cluster-wide quorum has not been reached to commit the transaction 108, or that the cluster-wide quorum has been reached to not commit the transaction 108, instructions to a set of secondary participants 114 of the cluster 106 to not commit the transaction 108. In this regard, the set of secondary participants 114 may be configured to comply with a determination by the set of primary participants 104 to commit or to not-commit the transaction 108.

Referring to FIGS. 1-6 and 9, and particularly FIG. 9, for the block diagram 900, the non-transitory computer readable medium 902 may include instructions 906 to determine, by a set of primary participants 104 of a cluster 106, whether a cluster-wide quorum has been reached to commit a transaction 108 associated with a distributed transactional database 110.

The processor 904 may fetch, decode, and execute the instructions 908 to send, based on the determination by the set of primary participants 104 that the cluster-wide quorum has been reached to commit the transaction 108, instructions to a set of secondary participants 114 of the cluster 106 to commit the transaction 108. In this regard, the set of secondary participants 114 may be configured to comply with a determination by the set of primary participants 104 to commit or to not-commit the transaction 108.

The processor 904 may fetch, decode, and execute the instructions 910 to send, based on the determination by the set of primary participants that the cluster-wide quorum has been reached to commit the transaction 108, instructions to additional primary participants of the cluster 106 to commit the transaction 108. In this regard, the additional primary participants are not tasked to perform quorum analysis for committing or not-committing the transaction 108.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   at least one processor; and
   a non-transitory computer readable medium storing machine readable instructions that when executed by the at least one processor cause the at least one processor to:
   determine, by a set of primary participants of a cluster, whether a cluster-wide quorum has been reached to commit a transaction associated with a distributed transactional database by determining whether greater than one-half of the primary participants have determined to commit the transaction associated with the distributed transactional database; and
   based on the determination by the set of primary participants that the cluster-wide quorum has been reached to commit the transaction, send instructions to a set of secondary participants of the cluster to commit the transaction, wherein the set of secondary participants is to comply with a determination by the set of primary participants to commit or to not-commit the transaction.

2. The apparatus according to claim 1, wherein the machine readable instructions further cause the at least one processor to:
   based on a determination by the set of primary participants that the cluster-wide quorum has not been reached to commit the transaction, send instructions to the set of secondary participants of the cluster to not commit the transaction.

3. The apparatus according to claim 1, wherein the machine readable instructions further cause the at least one processor to:
   based on a determination by the set of primary participants that the cluster-wide quorum has been reached to not commit the transaction, send instructions to the set of secondary participants of the cluster to not commit the transaction.

4. The apparatus according to claim 1, wherein the machine readable instructions further cause the at least one processor to:
   specify a number of the primary participants as being less than a number of the secondary participants.

5. The apparatus according to claim 1, wherein the machine readable instructions further cause the at least one processor to:
   specify a number of the primary participants as being equal to a number of the secondary participants.

6. The apparatus according to claim 1, wherein the machine readable instructions further cause the at least one processor to:
   specify a number of the primary participants as being greater than a number of the secondary participants.

7. The apparatus according to claim 1, wherein the transaction represents an initial transaction, and wherein the machine readable instructions further cause the at least one processor to:
   specify a number of the secondary participants for a further transaction as being different from a number of the secondary participants for the initial transaction.

8. The apparatus according to claim 1, wherein the machine readable instructions further cause the at least one processor to:
based on the determination by the set of primary participants that the cluster-wide quorum has been reached to commit the transaction, send instructions to additional primary participants of the cluster to commit the transaction, wherein the additional primary participants are not tasked to perform quorum analysis for committing or not-committing the transaction.

9. The apparatus according to claim 1, wherein the machine readable instructions further cause the at least one processor to:
determine that the primary participants are operational after a malfunction of the primary participants;
determine a version associated with the primary participants prior to the malfunction of the primary participants; and
set a version of the cluster as the version associated with the primary participants prior to the malfunction of the primary participants.

10. The apparatus according to claim 1, wherein the primary participants include data segment coverage, and wherein the machine readable instructions further cause the at least one processor to:
based on a determination that a primary participant of the primary participants including data segment coverage has malfunctioned, send instructions to all participants of the cluster to not commit the transaction.

11. A computer implemented method comprising:
determining, by a processor, by a set of primary participants of a cluster, whether a cluster-wide quorum has been reached to commit a transaction associated with a distributed transactional database by determining whether greater than one-half of the primary participants have determined to commit the transaction associated with the distributed transactional database; and
based on a determination by the set of primary participants that the cluster-wide quorum has been reached to not commit the transaction, sending, by the processor, instructions to a set of secondary participants of the cluster to not commit the transaction, wherein the set of secondary participants is to comply with a determination by the set of primary participants to commit or to not-commit the transaction.

12. The computer implemented method according to claim 11, further comprising:
based on a determination by the set of primary participants that the cluster-wide quorum has been reached to commit the transaction, sending, by the processor, instructions to the set of secondary participants of the cluster to commit the transaction.

13. The computer implemented method according to claim 11, further comprising:
specifying, by the processor, a number of the primary participants as being different from a number of the secondary participants.

14. The computer implemented method according to claim 11, further comprising:
specifying, by the processor, a number of the primary participants as being same as a number of the secondary participants.

15. A non-transitory computer readable medium storing machine readable instructions that, when executed, cause a processor to:
determine, by a set of primary participants of a cluster, whether a cluster-wide quorum has been reached to commit a transaction associated with a distributed transactional database by determining whether greater than one-half of the primary participants have determined to commit the transaction associated with the distributed transactional database; and
based on the determination by the set of primary participants that the cluster-wide quorum has been reached to commit the transaction, send instructions to a set of secondary participants of the cluster to commit the transaction, wherein the set of secondary participants is to comply with a determination by the set of primary participants to commit or to not-commit the transaction.

16. The non-transitory computer readable medium according to claim 15, wherein the machine readable instructions, when executed, further cause the processor to:
based on a determination by the set of primary participants that the cluster-wide quorum has not been reached to commit the transaction, send instructions to the set of secondary participants of the cluster to not commit the transaction.

17. The non-transitory computer readable medium according to claim 15, wherein the machine readable instructions, when executed, further cause the processor to:
based on a determination by the set of primary participants that the cluster-wide quorum has been reached to not commit the transaction, send instructions to the set of secondary participants of the cluster to not commit the transaction.

18. The non-transitory computer readable medium according to claim 15, wherein the primary participants that determine whether the cluster-wide quorum has been reached are designated quorum primary participants, and wherein the machine readable instructions, when executed, further cause the processor to:
determine that the quorum primary participants are operational after a malfunction of the quorum primary participants;
determine a version associated with the quorum primary participants prior to the malfunction of the quorum primary participants; and
set a version of the cluster as the version associated with the quorum primary participants prior to the malfunction of the quorum primary participants.

19. The non-transitory computer readable medium according to claim 15, wherein the primary participants that determine whether the cluster-wide quorum has been reached are designated quorum primary participants, wherein the quorum primary participants include data segment coverage, and wherein the machine readable instructions, when executed, further cause the processor to:
based on a determination that a primary participant of the quorum primary participants including data segment coverage has malfunctioned, send instructions to all participants of the cluster to not commit the transaction.

20. The non-transitory computer readable medium according to claim 15, wherein the machine readable instructions, when executed, further cause the processor to:
based on the determination by the set of primary participants that the cluster-wide quorum has been reached to commit the transaction, send instructions to additional primary participants of the cluster to commit the transaction, wherein the additional primary participants are not tasked to perform quorum analysis for committing or not-committing the transaction.

* * * * *